US011443585B2

(12) United States Patent
Kek et al.

(10) Patent No.: US 11,443,585 B2
(45) Date of Patent: Sep. 13, 2022

(54) VERTICAL ROULETTE MECHANISM WITH ROTATING RIM

(71) Applicant: Interblock d.d., Menges (SI)

(72) Inventors: Emil Kek, Kamnik (SI); Rok Kokoravec, Kamnik (SI); Peter Kroselj, Kamnik (SI); Matic Magdalenc, Kamnik (SI); Joze Pececnik, Kamnik (SI)

(73) Assignee: INTERBLOCK D.D., Menges (SI)

( * ) Notice: Subject to any disclaimer, the term of this patent is extended or adjusted under 35 U.S.C. 154(b) by 9 days.

(21) Appl. No.: 17/064,473

(22) Filed: Oct. 6, 2020

(65) Prior Publication Data

US 2021/0110643 A1 Apr. 15, 2021

Related U.S. Application Data

(60) Provisional application No. 62/914,336, filed on Oct. 11, 2019.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3216* (2013.01); *G07F 17/3211* (2013.01); *G07F 17/3288* (2013.01)

(58) Field of Classification Search

USPC .............................. 463/1, 17, 20, 22, 25, 39

See application file for complete search history.

(56) References Cited

U.S. PATENT DOCUMENTS

| | | | | |
|---|---|---|---|---|
| 2002/0169017 A1* | 11/2002 | Visoenik | A63F 5/00 | 463/17 |
| 2006/0119036 A1 | 6/2006 | Scozio | | |
| 2008/0242393 A1 | 10/2008 | Kido | | |
| 2009/0233698 A1* | 9/2009 | Koyama | G07F 17/32 | 463/25 |
| 2012/0112408 A1* | 5/2012 | Poon | A63F 5/043 | 273/142 R |

(Continued)

FOREIGN PATENT DOCUMENTS

CN 102462957 A 5/2012

*Primary Examiner* — Adetokunbo O Torimiro
(74) *Attorney, Agent, or Firm* — BakerHostetler

(57) ABSTRACT

A single player vertical roulette mechanism is directed that includes a stand, a wheel, a rotating rim and two drive mechanisms. The wheel is configured to be mounted to the stand and rotate relative to the stand. The wheel includes a plurality of numbers corresponding to a roulette wheel. One drive mechanism is affixed to the stand and configured to rotate the wheel. A second drive mechanism is affixed to the stand and configured to rotate the rotating rim. A roulette ball is fixedly mounted to the rotating rim. A plurality of lights are fixedly mounted to the stand between the stand and the wheel. A light illuminates the ball. The plurality of lights illuminate the wheel so the numbers are visible to a player of the vertical roulette mechanism. The stand is further connected to a seat for a single player such that the roulette mechanism can be substituted for a traditional slot machine cabinet.

21 Claims, 13 Drawing Sheets

(56) References Cited

U.S. PATENT DOCUMENTS

| | | | | |
|---|---|---|---|---|
| 2014/0361484 | A1* | 12/2014 | Jones | A63F 5/046 273/142 F |
| 2015/0321082 | A1* | 11/2015 | Kawabata | G07F 17/3213 273/142 E |
| 2019/0108718 | A1 | 4/2019 | Kek et al. | |

* cited by examiner

VERTICAL ROULETTE MECHANISM WITH ROTATING RIM

CROSS REFERENCE TO RELATED APPLICATION

This application claims benefit under 35 U.S.C. § 119(e) of Provisional U.S. Patent Application No. 62/914,336, filed Oct. 11, 2019, the contents of which is incorporated herein by reference in its entirety.

BACKGROUND INFORMATION

Slot machines and other wagering games capable of being played within similar cabinets in casinos and other gaming establishments have been very popular. In a typical configuration, rows of cabinets offering the same of similar games are set up with each cabinet touching the one next to it. To perform maintenance on these cabinets or to change the type of game being offered in the cabinet, it is often necessary to shut down the game and pull the cabinet out of the row it is in and into the area where players normally sit. This in turn usually requires other games around the cabinet being worked on to be shut down as well.

While a computerized slot machine, which does not include any physical components other than an interactive display, can be readily reprogrammed to provide a different game, the type of game is limited to just what can be displayed. There is no opportunity to replace the display with a different type of game, such as one that incorporate mechanical elements into the game as well. To offer that type of game in place of the slot machine, the entire cabinet would have to be removed and replaced. If the new cabinet is not exactly the same as the prior cabinet, the new cabinet may not align well with other cabinets in the same row, giving the row an awkward and unappealing appearance. Further, whether a cabinet has to be pulled out for maintenance or repair or conversion to another game or a cabinet has to be replaced, such operations are disruptive to the gaming area, require multiple machines to be shut down, and can significantly increase costs while revenue is lost.

It is also desirable to be able to provide a wide array of different games within a gaming cabinet, including dice, wheel and balls games that rely on gravity, such as roulette. The size of the cabinets, however, is problematic because the roulette wheel needs more horizontal space than is available. Yet, turning the roulette wheel vertical makes it impossible to spin a ball around the roulette wheel, which is critical to the game.

TECHNICAL FIELD

The present disclosure relates generally, but not exclusively, to the field of gaming, particularly gaming cabinets for different games, including roulette.

SUMMARY

An embodiment is directed to a gaming cabinet that includes a base section and a replaceable topper. The base section including a controller module and a computer module. The controller module including a plurality of connectors. The base section having an upper section and a lower section. The upper section including an interactive display and one or more buttons configured to enable a player to interact with the two or more games at least partially displayed on the display. The replaceable topper being configured to connect to the base section. The replaceable topper including electronics configured to enable an aspect of a first game among the two or more games to be played and including a plurality of connectors configured to mate with the plurality of connectors of the base section, wherein replacement of the replaceable topper enables a second game among the two or more games to be played.

An embodiment is directed to a single player vertical roulette mechanism that includes a stand, a wheel, a rotating rim and two drive mechanisms. The wheel is configured to be mounted to the stand and rotate relative to the stand. The wheel includes a plurality of numbers corresponding to a roulette wheel. One drive mechanism is affixed to the stand and configured to rotate the wheel. A second drive mechanism is affixed to the stand and configured to rotate the rotating rim. A roulette ball is fixedly mounted to the rotating rim. A plurality of lights are fixedly mounted to the stand between the stand and the wheel. The plurality of lights illuminate the wheel so the numbers are visible to a player of the vertical roulette mechanism. The stand is further connected to a seat for a single player such that the roulette mechanism can be substituted for a traditional slot machine cabinet.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Disclosed herein are methods, systems, and computer readable storage media that provide for increased guest satisfaction, game revenue generation and reduced maintenance costs. Some embodiments of the present invention are described herein in terms of a gaming cabinets for particular games for illustrative purposes. However, embodiments of the present invention are not limited to just the types of games described and may be implemented in various wagering systems—both automated and manual—that provide similar functionalities.

Figure 1:
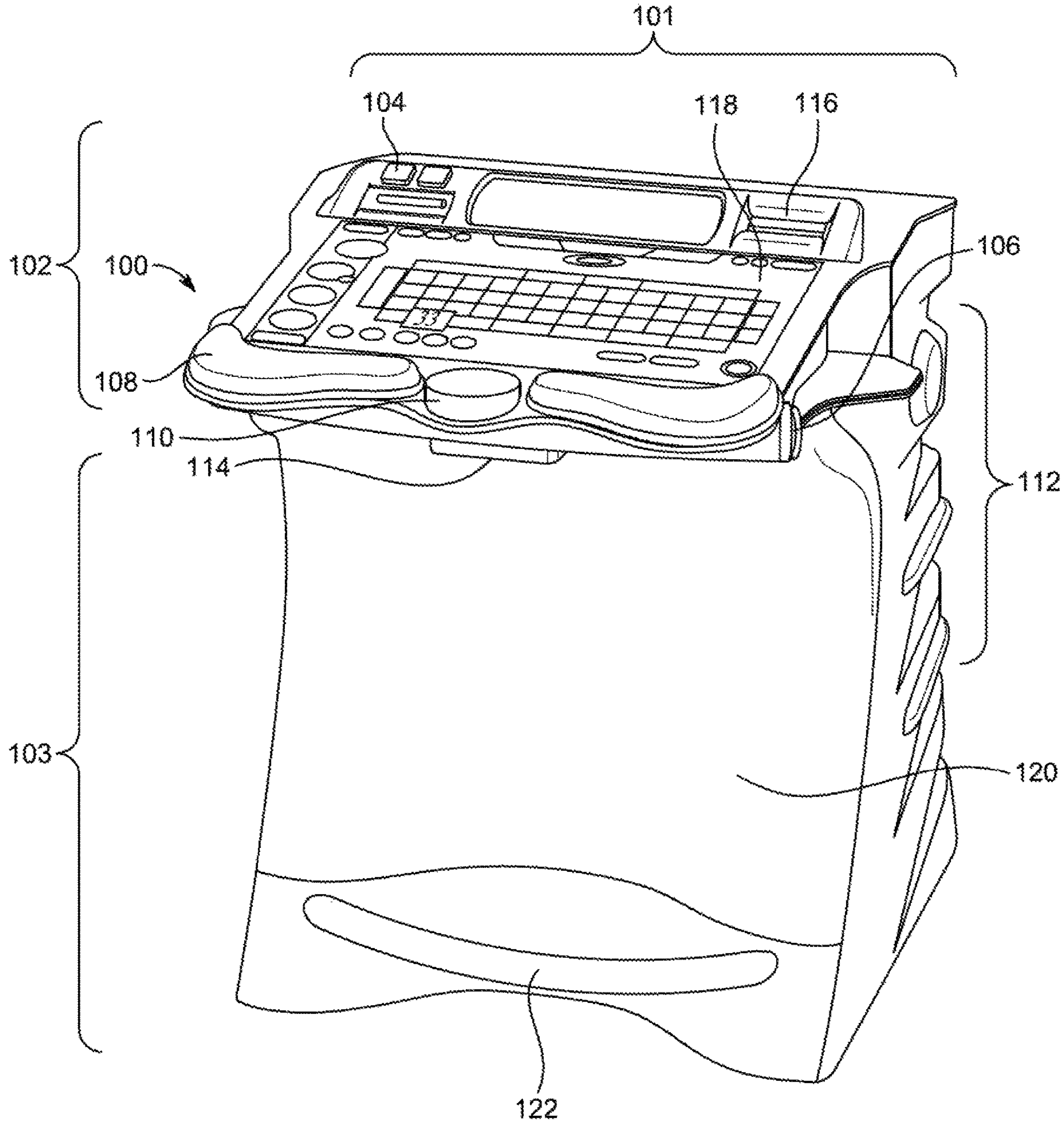
FIG. 1 is a diagrammatic, perspective view of a universal cabinet base, in accordance with an embodiment.
Figure 2:
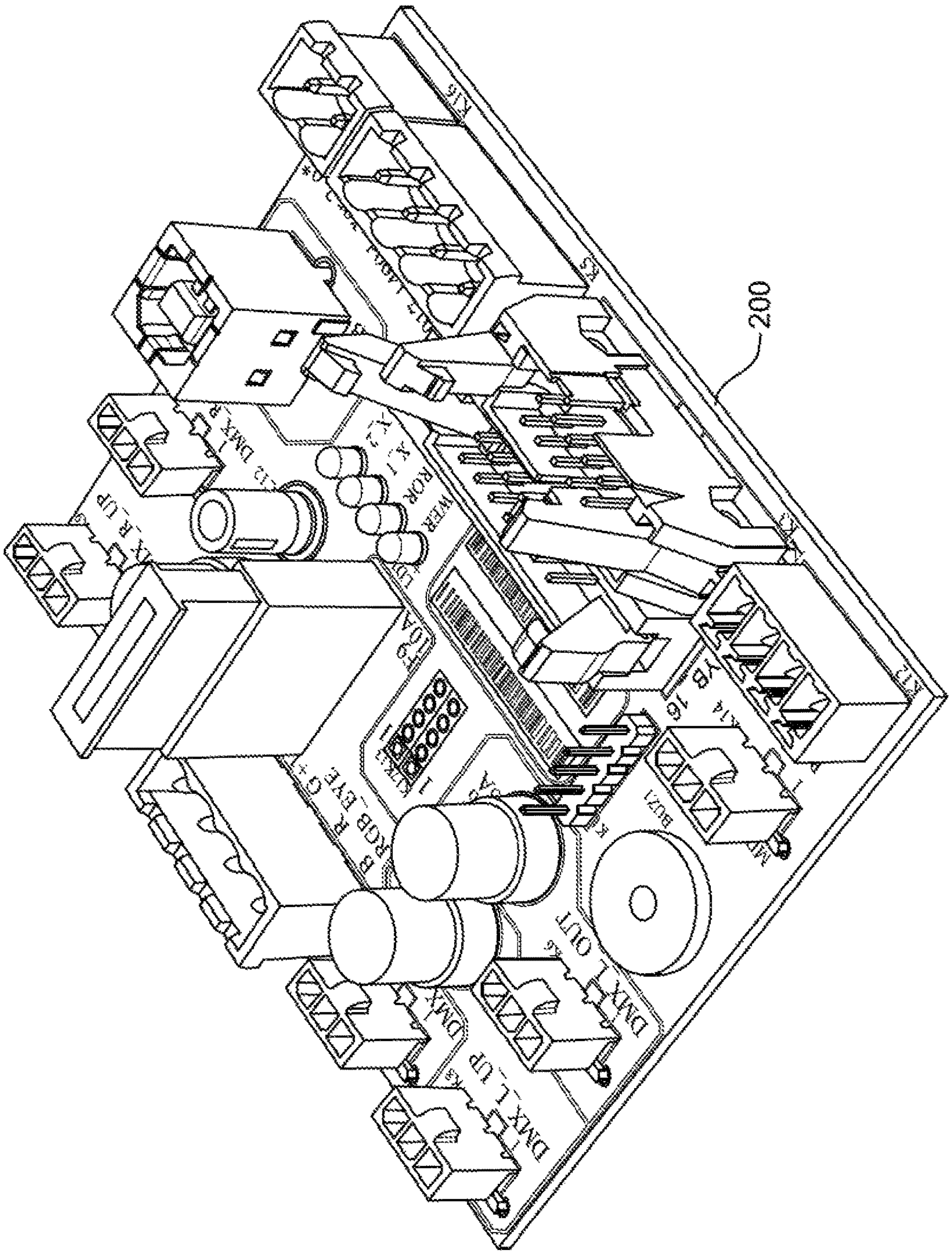
FIG. 2 is a diagrammatic, perspective view of a control module for the universal cabinet base of FIG. 1.

FIG. 1 illustrates a base 100 for a universal cabinet for a variety of different games that may be connected to a top 101 of an upper section 102 of the base 100. The base 100 may further include a lower section 103 on which the upper section rests. As further illustrated in FIG. 3 and FIG. 4, the base 100 may include a number of exterior elements that provide visual and audio effects that serve to either attract attention to the game, so as to entice someone passing by to play a game offered by the universal cabinet, or to enhance the play of a game being played in the universal cabinet.

The exterior elements may include soft touch gel buttons, such as buttons 104 and 106, gel arm rests 108 at the bottom of the upper section 102 where a players arms would rest for extended periods of time, and a control button 110 that may be used for different games. Other lighting effects that may be provided include gel LED modules 112 of different sizes and shapes and an ambient LED 114 that illuminates the bottom section 103 from underneath the upper section 102. The upper section 102 may further include a money/credit/card receiving/payout mechanism 116 and a display 118. Speakers 120 in the lower section 103 may provide some or all of the sound, depending on the nature of the game being played. A foot rest 122 may also be built into the lower section 102.

The inside of the universal cabinet may include a controller module 200 that may provide common connections for each of the different types of toppers and provide a USB connection to an embedded computer (not shown) in the bottom section 103. The embedded computer may be a GANLOT AMDY-7005, which is designed for gaming applications. The controller module 200 may also provide outputs for the base cabinet lighting and buttons, which makes it possible to offer numerous gaming machine lighting designs. The controller module 200 may also make it possible to quickly change toppers on the base 100. Only the upper section 102 may need to be removed to access the controller module 200. Connections from the existing topper may be disconnected and the topper removed from the upper section 102. The new topper may then be attached to the upper section 102 and its connections plugged into the controller module 200. In an embodiment, a switch in the controller module 200 may then be switched to correspond to the new topper. In other embodiments, the new topper can be identified by connecting or plugging one or more additional modules for that topper into the controller module 200 or changing a program of the embedded computer. This may make it possible to quickly change the type of game that is being played on the universal cabinet base 100 without having to remove the base 100 from any row it is in and without moving other machines or forcing the other machines to be shut down. The may also make it possible to prototype and develop other toppers for new games, further reducing development and production costs.

Figure 3:
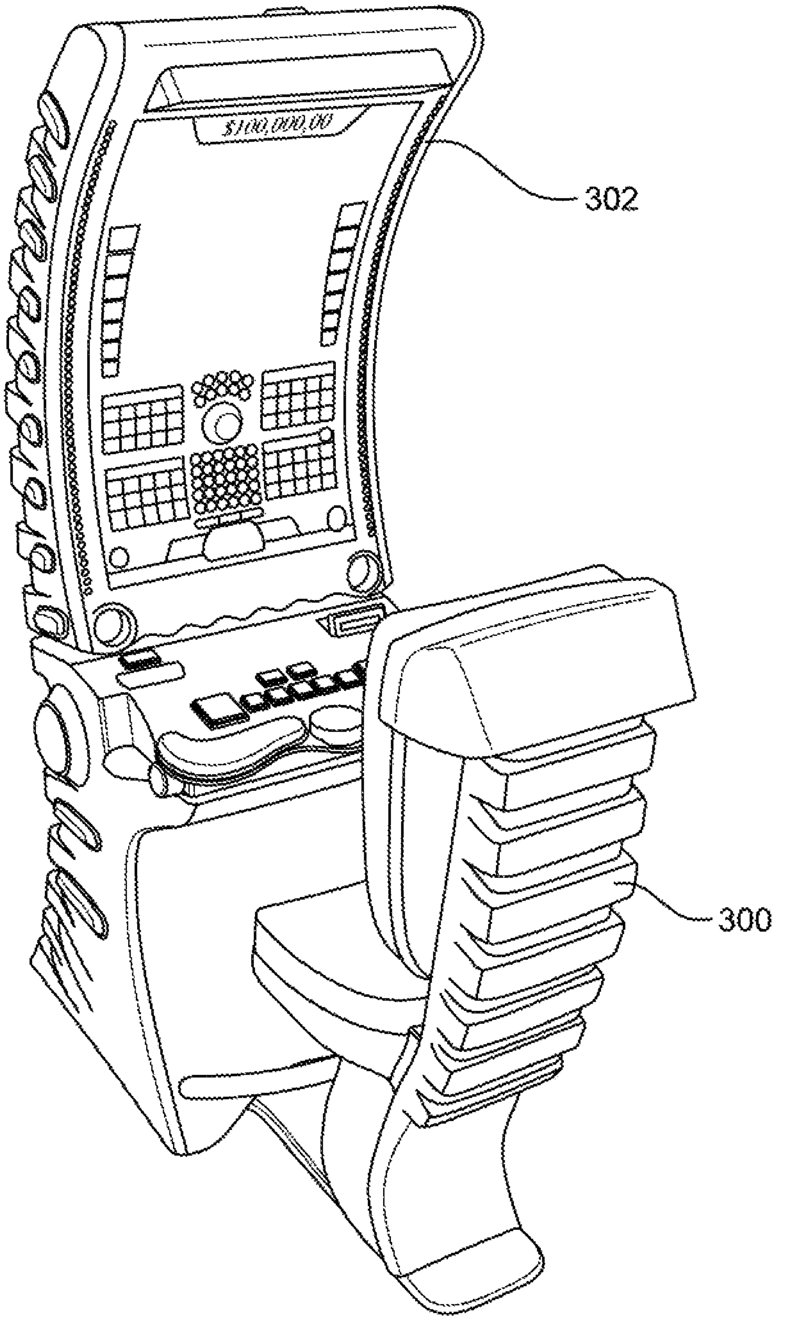
FIG. 3 is a diagrammatic, perspective view of the universal cabinet of FIG. 1 including a seat and a display topper and some of its visual effect components.
Figure 4:
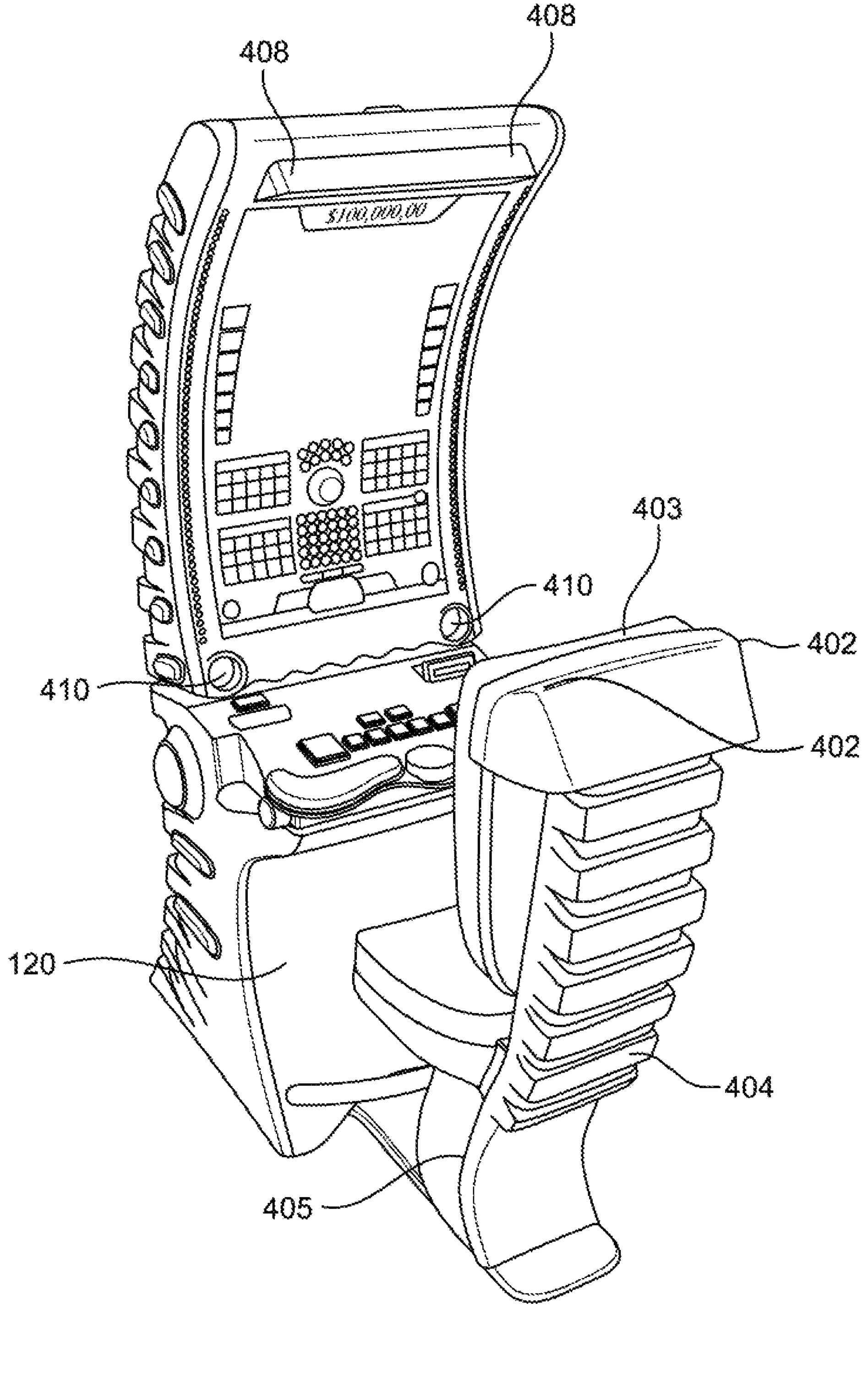
FIG. 4 is a diagrammatic, perspective view of the universal cabinet of FIG. 1 including a seat and a tall curved display topper and some of its audio effects components.
Figure 5:
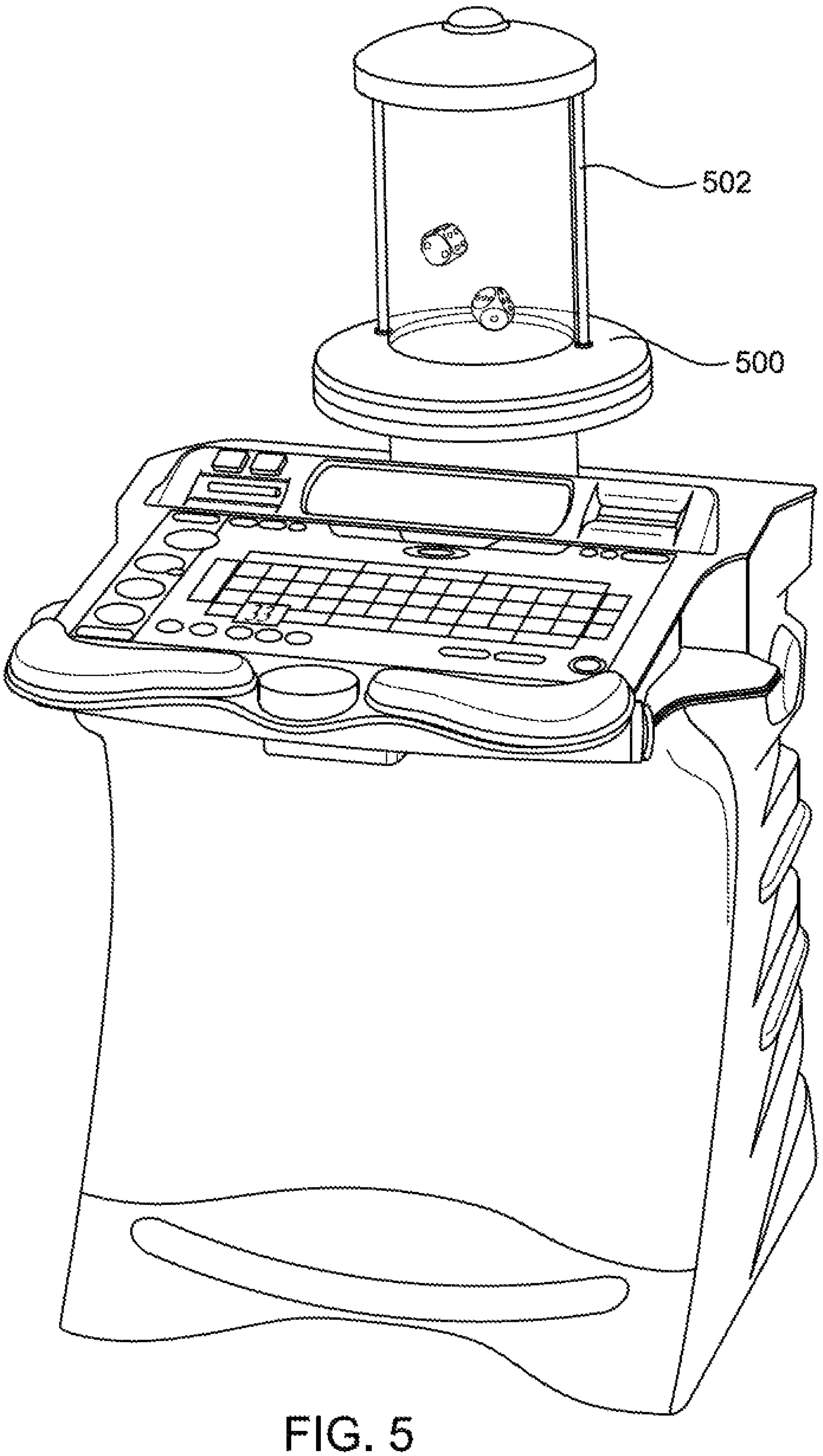
FIG. 5 is a diagrammatic, perspective view of the universal cabinet of FIG. 1 with a dice game topper.

As previously noted, FIG. 3 and FIG. 4 further illustrate the base 100 of the universal cabinet when a seat 300 and a tall curved display topper 302 have been connected. In addition to the speakers 120 built into the lower section 103 of the base 100, such as a 50 Watt/4 Ohm subwoofer speaker, the seat 300 may include additional speakers 402, such as two 25 Watt/8 Ohm speakers in an upper section 403 of the seat 300. Additional speakers may be included in the topper 302, such as two 25 Watt/8 Ohm speakers 408 at the top of the topper 302 and two 25 Watt/8 Ohm speakers 410 at the bottom of the topper 302. In addition to those speakers, a 50 Watt/4 Ohm rumble speaker 404 may be provided in the bottom section 405 of the seat 300. This many speakers may enable a variety of audio effects, especially if a range of speaker types are used, including tweeters, midranges and subwoofers or woofers.

FIG. 5, FIG. 6, FIG. 7 and FIG. 8 illustrate different types of topper that may be added to the base 100 as previously discussed. These toppers include the dice topper 500 of FIG. 5, which enables craps and similar types of dice games to be played. The base 100 includes a random generator (not shown) for controlling the randomness of the dice roll in order to make the game fair. Even though the dice are being tossed as part of the game in the see-through section 502 of the dice topper 500, the game cycle speed may be just as fast as slot machine game cycles, thereby providing a different and more exciting form of a game with at least the same revenue potential as a slot machine being played for the same period of time. Depending on the type of game incorporated into the topper, the base 100 may send random results for the game to the topper and in other cases the topper may send the random results to the bottom. For example, in the dice game, the resulting throw of the dice may be randomly effected by a random generator in the base, but the resulting throw cannot be predetermined so it has to be determined at the topper and then sent to the base 100.

Figure 6:
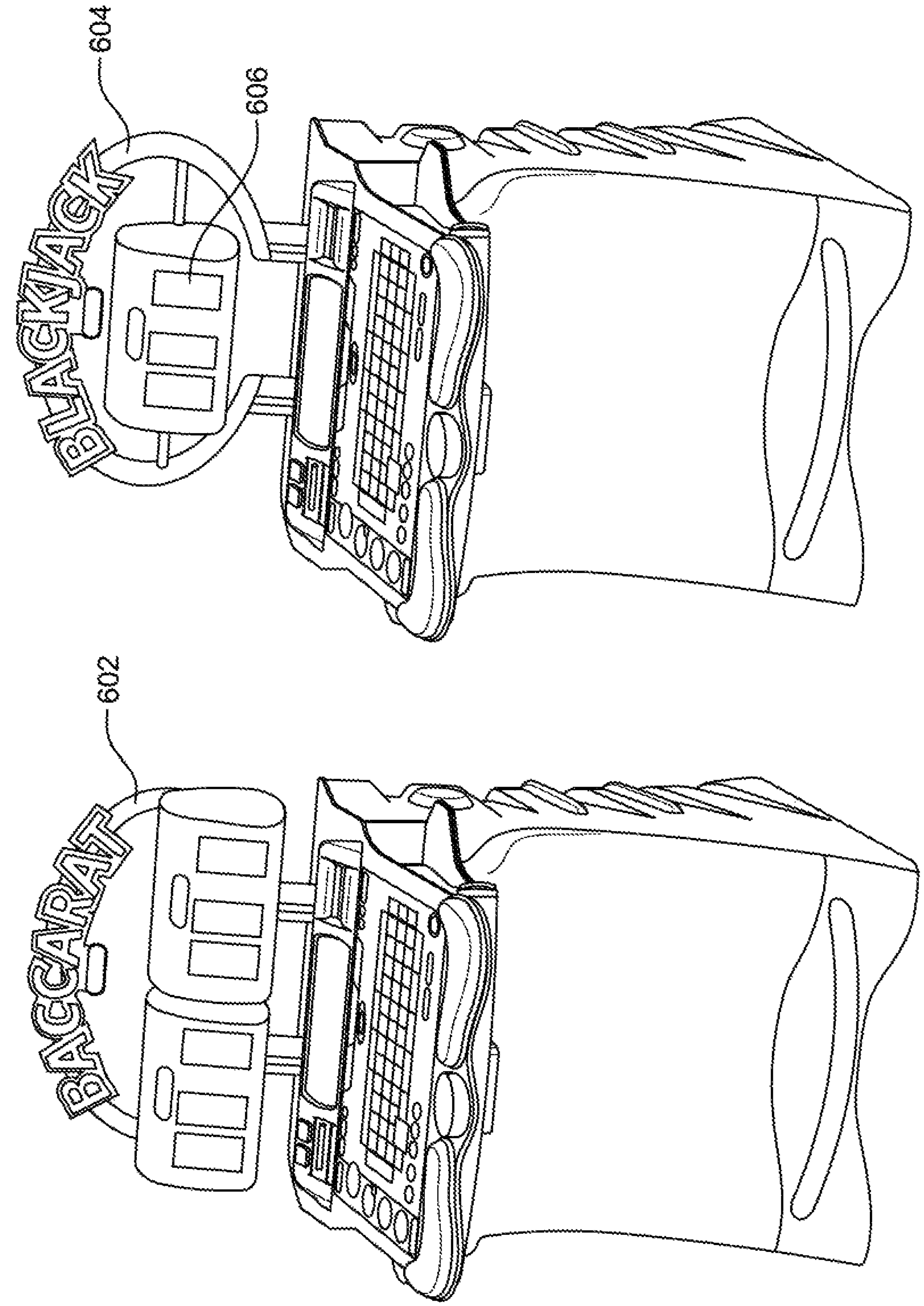
FIG. 6 is a diagrammatic, perspective view of the universal cabinet of FIG. 1 with a card game topper for baccarat and blackjack.
Figure 7:
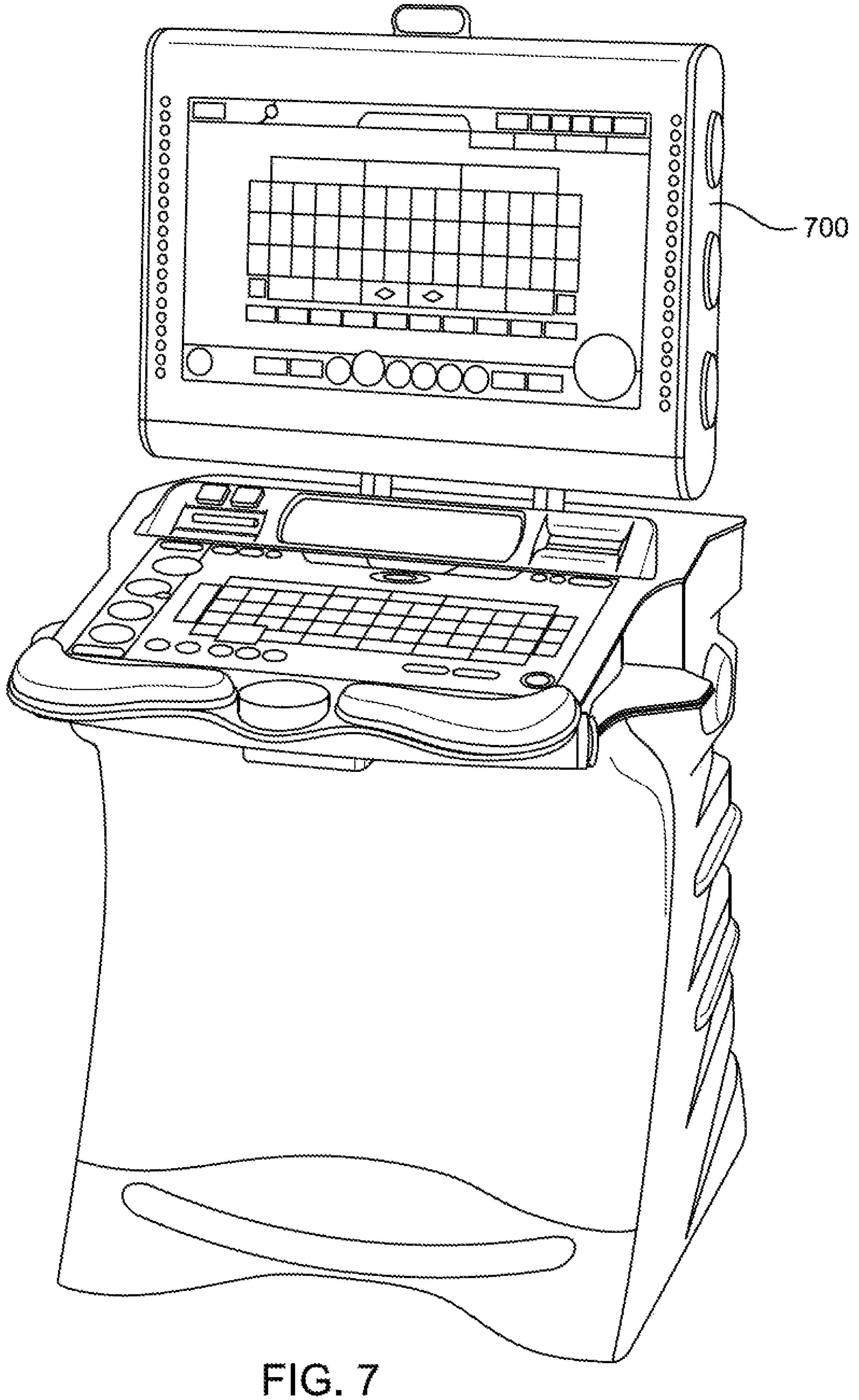
FIG. 7 is a diagrammatic, perspective view of the universal cabinet of FIG. 1 with a wide display topper.
Figure 8:
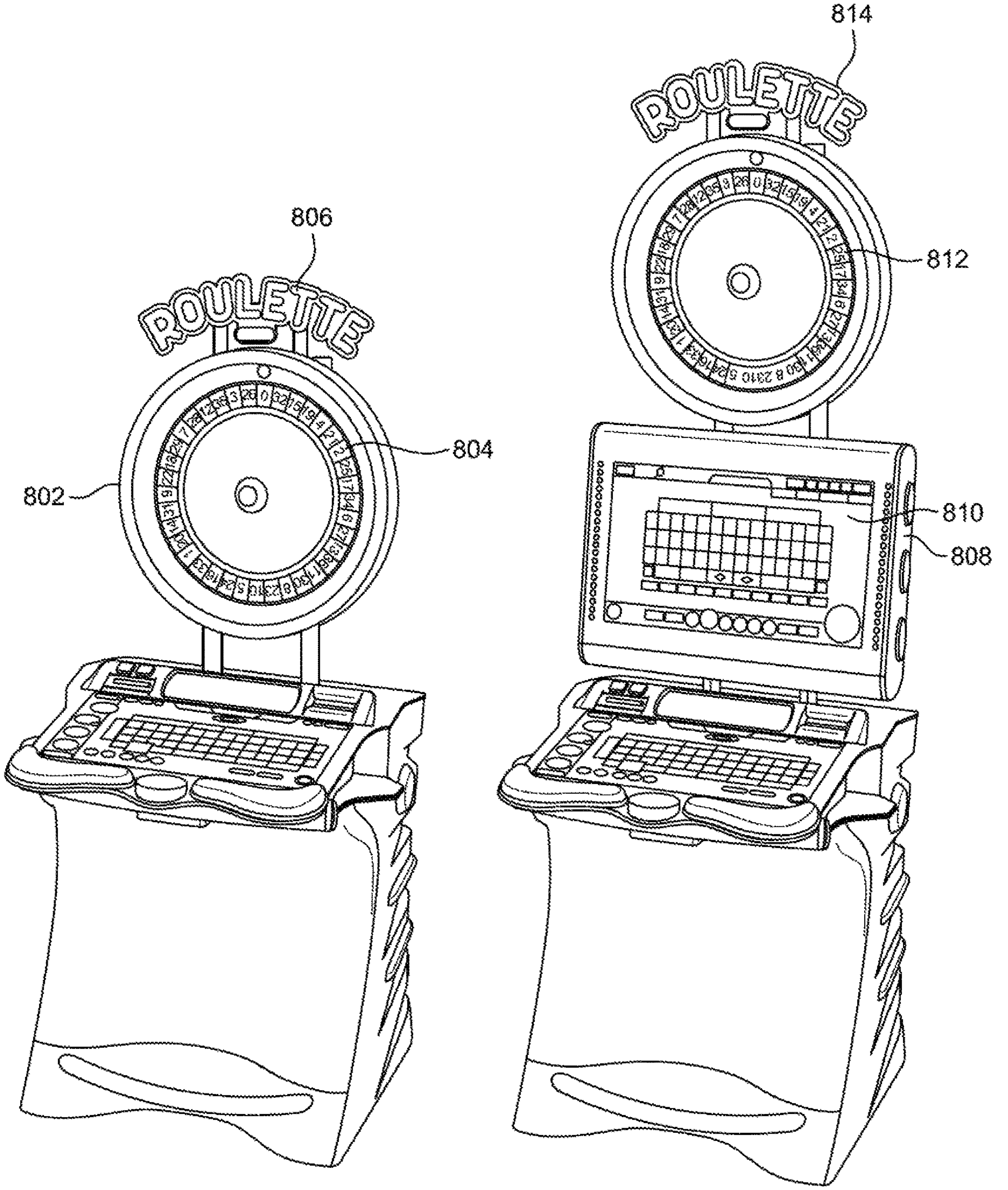
FIG. 8 is a diagrammatic, perspective view of the universal cabinet of FIG. 1 with two embodiments of vertical roulette toppers.

FIG. 6 illustrates to card game toppers, a baccarat topper 602 and a blackjack topper 604. Each of the card mechanism 606, such as a SUZO card flipper module, may flip cards under control of the random generator. The card decks can be varied depending on the game, such as a classic deck with or without jokers, and cards including the back sides of cards so cards can be covered. FIG. 7 illustrates a display card topper 700 where the display is wider than tall, which may allow higher resolution display. FIG. 8 illustrates two different versions of vertical roulette toppers 802 and 808. Vertical roulette topper 802 includes a roulette wheel 804 and signage 806 on top of the roulette wheel 804, while vertical roulette topper 808 includes an additional display 808 on top of which is mounted a roulette wheel 812 and signage 814.

Figure 9:
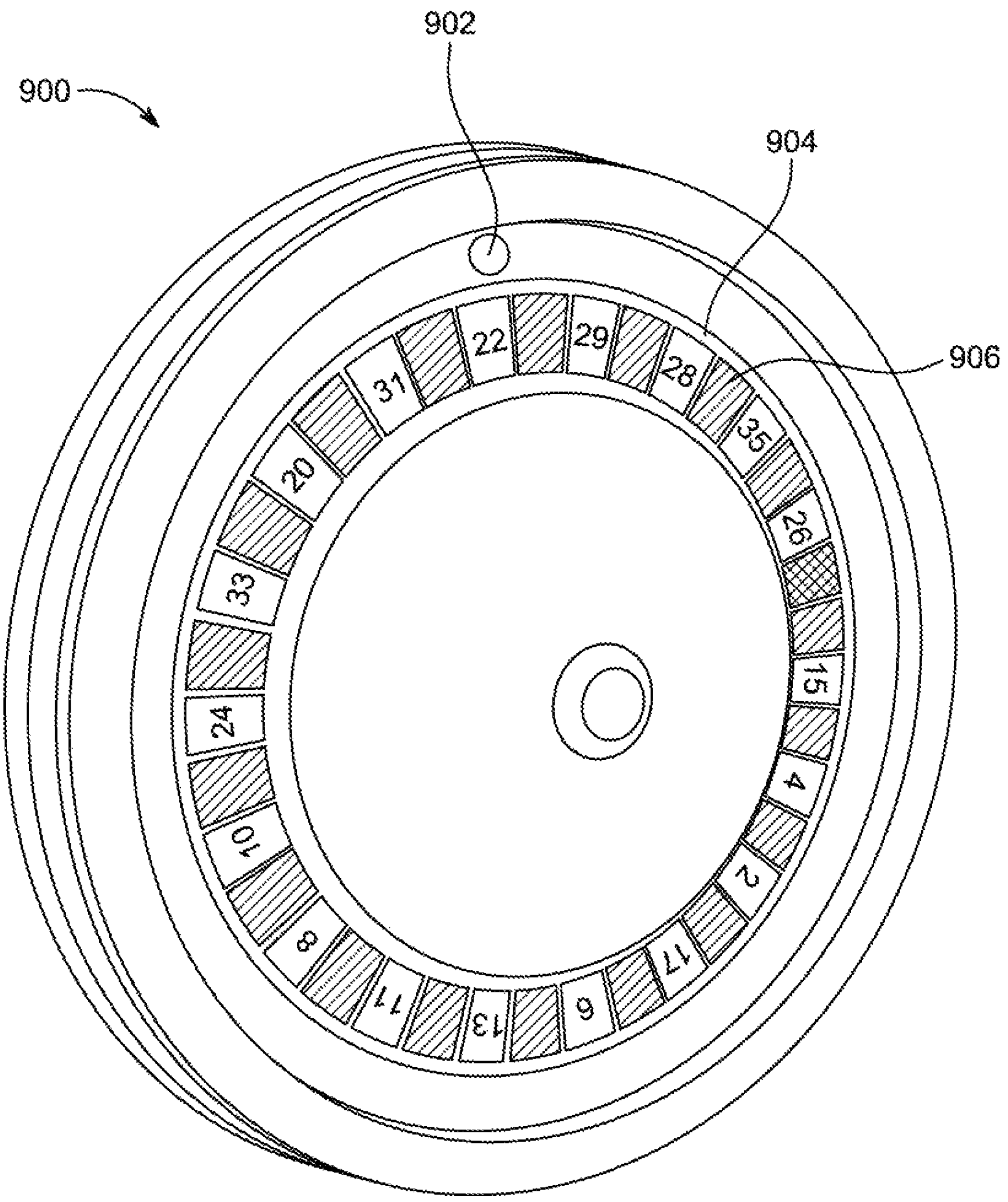
FIG. 9 is a diagrammatic, perspective view of a vertical roulette topper for the universal cabinet of FIG. 1.
Figure 10:
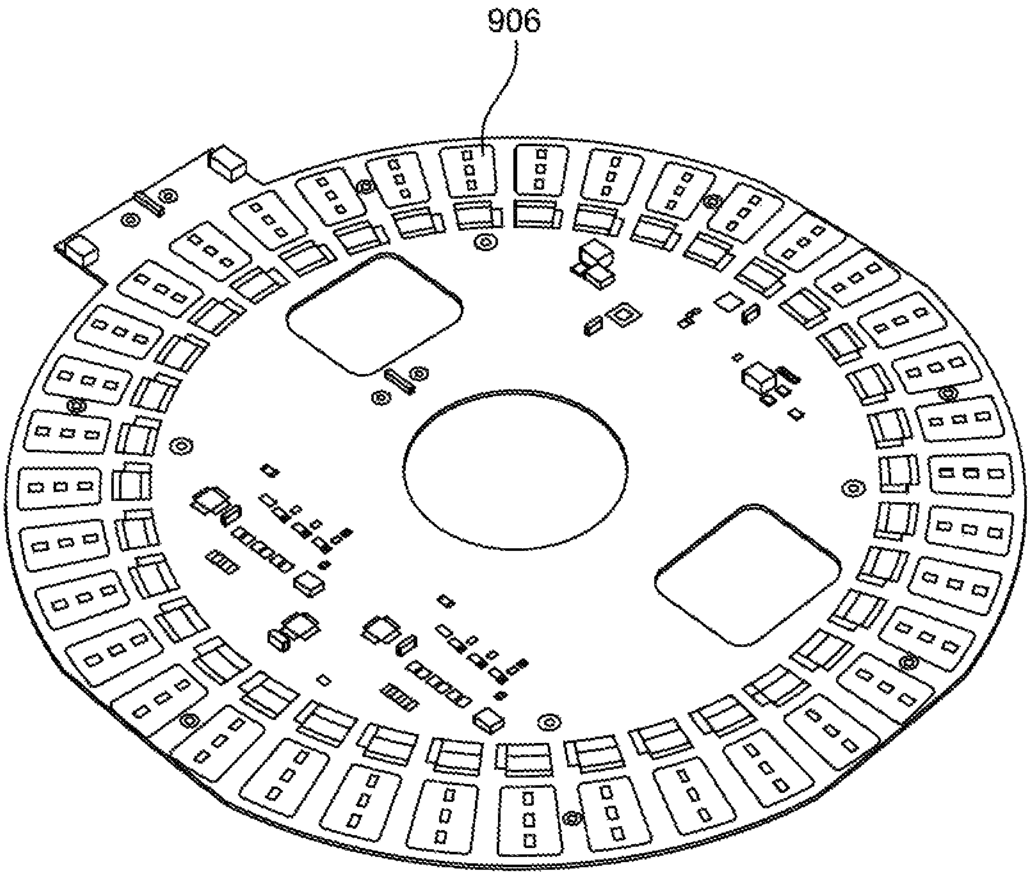
FIG. 10 is a diagrammatic, perspective view of a multi-functional board for the vertical roulette topper of FIG. 9.

As illustrated in FIG. 9 and FIG. 10, the vertical roulette wheel 900 includes a stationary roulette ball 902, which is shown mounted to a non-moving portion of the wheel 900 near the top, although other positions are possible. Since the roulette ball 902 does not move, the numbers do, which may be accomplished by mounting a circular ring of numbers on a transparent or translucent number wheel 904 that can be rotated based on the random generator of the base 100. To simplify the electro-mechanics associated with rotating the number wheel 904, the number wheel 904 may be sufficiently translucent that LED lighting 906 provided behind the numbers is clearly visible. The LED lighting 906 circuit board is illustrated in FIG. 10. The numbers themselves may be physically printed or attached to the number wheel so they can be illuminated by the LED lighting 906. In play, the random generator may determine an amount of force to be applied to rotate number wheel 906 or the random generator may determine when a breaking force will be applied to the number wheel 906 or a combination of both.

Figure 11:
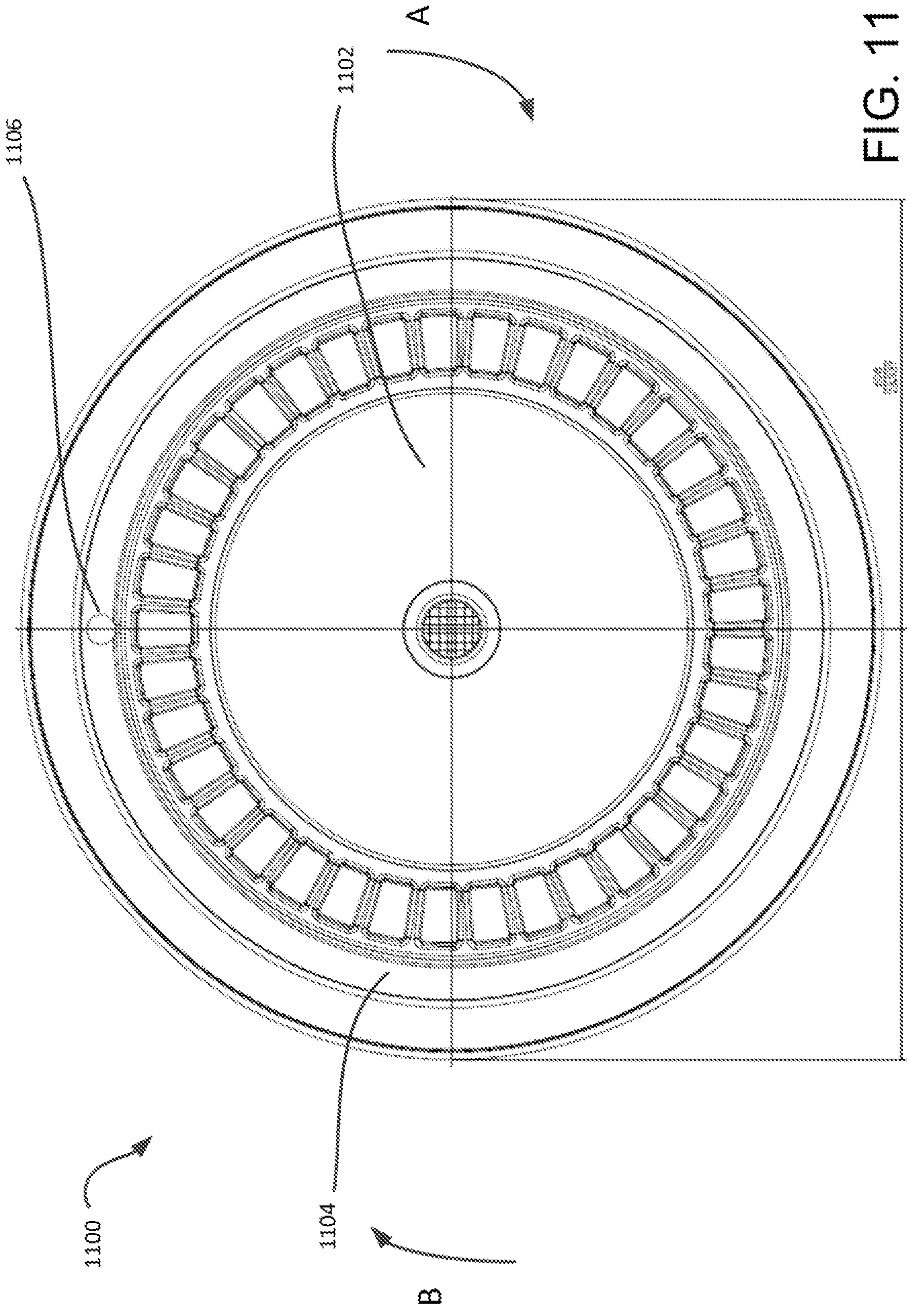
FIG. 11 is a side view of a vertical roulette topper with a rotating rim in accordance with an embodiment.
Figure 12:
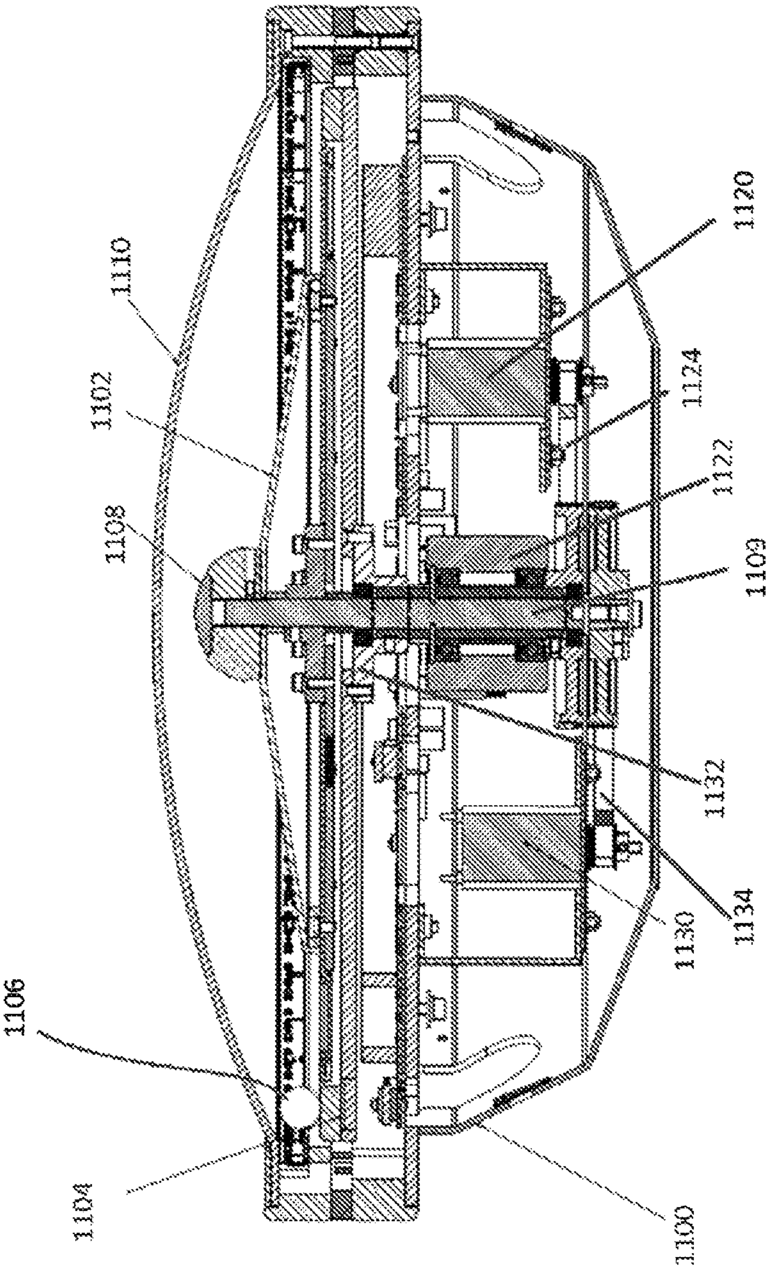
FIG. 12 is a cross-sectional side view of the vertical roulette topper of FIG. 11.

A different embodiment of the vertical roulette wheel 1100 is illustrated in FIG. 11 and FIG. 12. In this embodiment, the wheel 1102 is rotated in first direction A and a rotating rim 1104 is rotated in a second direction B that is the opposite of direction A. The rim 1104 rotates about the circumference of the wheel 1102. The roulette ball 1106 is fixedly attached to the rim 1104 such that it appears that the ball 1106 is spinning in the opposite direction of the wheel 1102 as it rotates. A light may illuminate the ball. This arrangement more closely replicates a standard horizontal roulette machine where the wheel is spun in one direction and the ball is spun around the wheel in the opposite direction, and may therefore be more comfortably attractive to players.

The embodiment is further illustrated in FIG. 12, which provides a cross-section view of the roulette wheel 1100 and the drive mechanisms, such as a motor, for the wheel 1102 and the rim 1104. The wheel includes a central hub 1108 connected to a stationary shaft 1109. A transparent cover 1110 covers the wheel 1102, rim 1104, ball 1106 and hub 1108. The wheel 1102 is rotated in first direction A by a first drive mechanism 1120, which is connected to a first rotatable member 1122 by a first belt 1124. The first rotatable member 1122 rotates about the stationary shaft 1109 in the first direction A. The rim 1104 is rotated in second direction V by a second drive mechanism 1130, which is connected to a second rotatable member 1132 by a second belt 1134. The second rotatable member 1132 rotates about the stationary shaft 1109 in the second direction B.

In an embodiment, a vertical roulette mechanism may comprise: a support stand; a wheel configured to be rotatably mounted to the support stand, the wheel including a plurality of numbers corresponding to a roulette wheel; a first drive mechanism affixed to the support stand and configured to rotate the wheel in a first direction while the support stand remains stationary; a rim configured to be rotatably mounted to the support stand, the rim including a roulette ball fixedly mounted to the rim; and a second drive mechanism affixed to the support stand and configured to rotate the rim in a second direction while the support stand remains stationary, the first direction being opposite to the second direction.

In the embodiment, further comprising a display. In the embodiment, further comprising a base section including a controller module and a computer module, the controller module including a plurality of connectors, the base section including an interactive display and one or more buttons configured to enable a player to interact with a roulette game at least partially displayed on the display, the wheel and the plurality of lights including connectors configured to mate with the plurality of connectors. In the embodiment, wherein the base section further includes one or more lights and one or more speakers, and wherein the roulette ball includes a light. In the embodiment, wherein the base section further includes a money/credit/card receiving/payout mechanism. In the embodiment, wherein the base section is configured to transmit randomly generated first control signals to the first drive mechanism to cause the wheel to rotate in the first direction as part of the roulette game, and wherein the base section is configured to transmit randomly generated second control signals to the second drive mechanism to cause the rim to rotate in the second direction as part of the roulette game. In the embodiment, further comprising: a first braking mechanism for braking the wheel when it is rotating in the first direction, the base section being further configured to transmit randomly generated third control signals to the first braking mechanism to cause the wheel to stop rotating as part of the roulette game; and a second braking mechanism for braking the rim when it is rotating in the second direction, the base section being further configured to transmit randomly generated fourth control signals to the second braking mechanism to cause the rim to stop rotating as part of the roulette game.

In the embodiment, further comprising: a plurality of lights fixedly mounted to the support stand between the support stand and the wheel, the plurality of lights configured to illuminate the wheel so the numbers are visible to a player of the vertical roulette mechanism, wherein rotation of the wheel, rotation of the rim, and illumination of the plurality of lights simulates the roulette ball spinning around the wheel of a horizontal roulette wheel. In the embodiment, wherein the base section includes an upper section and a lower section and the display is positioned in the upper section. In the embodiment, further comprising a base section connected to the support stand, the base section including a seat for a single player. In the embodiment, wherein the first drive mechanism includes a first motor and a first belt and the second drive mechanism includes a second motor and a second belt.

A vertical roulette mechanism, comprising: a support stand; a wheel configured to be rotatably mounted to the support stand, the wheel including a plurality of numbers corresponding to a roulette wheel; a first drive mechanism affixed to the support stand and configured to rotate the wheel in a first direction while the support stand remains stationary; a rim configured to be rotatably mounted to the support stand, the rim including a roulette ball fixedly mounted to the rim; and a second drive mechanism affixed to the support stand and configured to rotate the rim in a second direction while the support stand remains stationary, the first direction being opposite to the second direction; and a base section including a controller module and a computer module, the controller module including a plurality of connectors, the base section including an interactive display configured to connect to the plurality of connectors and one or more buttons configured to enable a player to interact with a roulette game at least partially displayed on the display.

In the embodiment, further comprising a plurality of lights fixedly mounted to the support stand between the support stand and the wheel, the plurality of lights configured to illuminate the wheel so the numbers are visible to a player, wherein the wheel and the plurality of lights including connectors configured to mate with the plurality of connectors. In the embodiment, wherein the base section further includes one or more lights and one or more speakers. In the embodiment, wherein the base section further includes a money/credit/card receiving/payout mechanism. In the embodiment, wherein the base section is configured to transmit randomly generated control signals to the first drive mechanism to cause the wheel to rotate as part of the roulette game and the second drive mechanism to cause the rim to rotate as part of the roulette game. In the embodiment, further comprising: a first braking mechanism for braking the wheel when it is rotating in the first direction, the base section being further configured to transmit randomly generated control signals to the first braking mechanism to cause the wheel to stop rotating as part of the roulette game; and a second braking mechanism for braking the rim when it is rotating in the second direction, the base section being further configured to transmit randomly generated control signals to the second braking mechanism to cause the rim to stop rotating as part of the roulette game.

The vertical roulette mechanism as recited in claim 12, further comprising: a plurality of lights fixedly mounted to the support stand between the support stand and the wheel, the plurality of lights configured to illuminate the wheel so the numbers are visible to a player of the vertical roulette mechanism, wherein rotation of the wheel, rotation of the rim, and illumination of the plurality of lights simulates the roulette ball spinning around the wheel of a horizontal roulette wheel. In the embodiment, wherein the base section includes an upper section and a lower section and a display is positioned in the upper section. In the embodiment, wherein the display is interactive and includes one or more buttons configured to enable a player to interact with a roulette game at least partially displayed on the display. In the embodiment, wherein the first drive mechanism includes a first motor and a first belt and the second drive mechanism includes a second motor and a second belt.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 13:
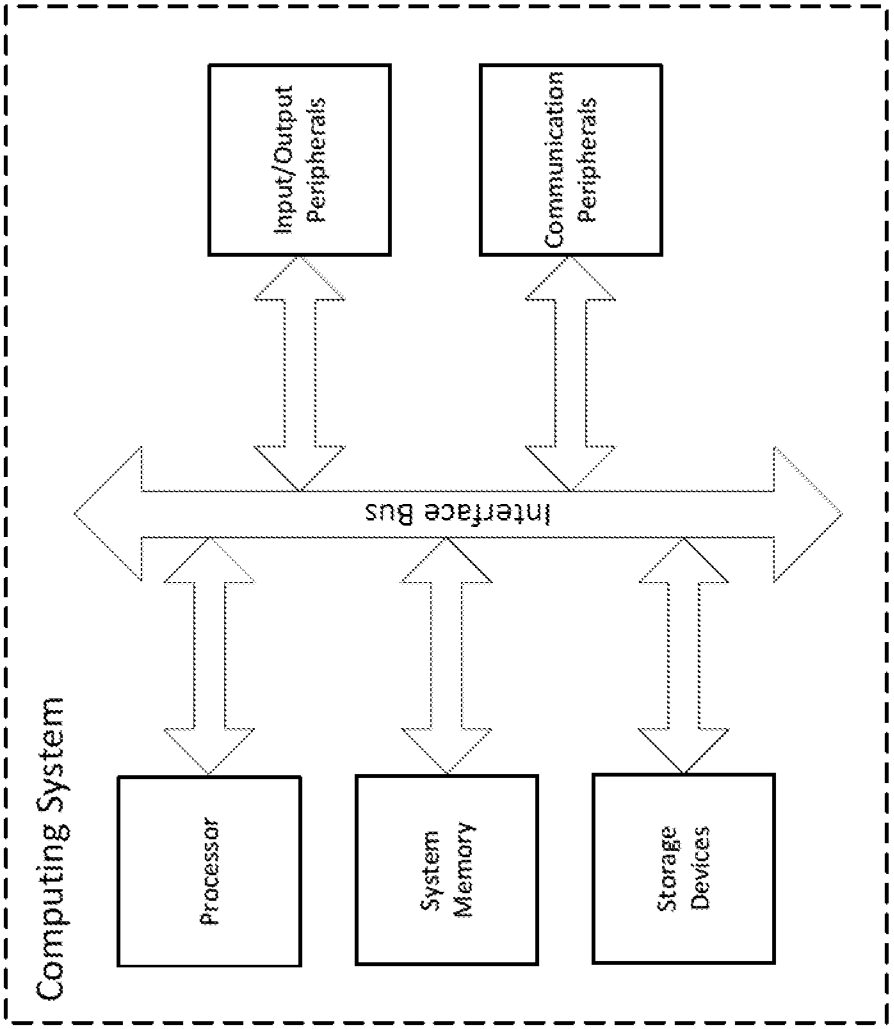
FIG. 13 is an illustration of an exemplary block diagram representing a general purpose computer system in which aspects of the methods and systems disclosed herein or portions thereof may be incorporated.

The techniques described above can be implemented on a computing device associated with a gaming device (e.g., a gaming cabinet), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 13 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the shooter selection and console mirroring, as described above. The computing system components may be present in the gaming device, in a server or other component of a network, or distributed between some combinations of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A vertical roulette mechanism, comprising:

a support stand;

a wheel configured to be rotatably mounted to the support stand, the wheel including a plurality of numbers corresponding to a roulette wheel;

a first drive mechanism affixed to the support stand and configured to rotate the wheel in a first direction while the support stand remains stationary;

a rim configured to be rotatably mounted to the support stand, the rim including a roulette ball fixedly mounted to the rim; and a second drive mechanism affixed to the support stand and configured to rotate the rim in a second direction while the support stand remains stationary, the first direction being opposite to the second direction.

2. The vertical roulette mechanism as recited in claim 1, further comprising a display.

3. The vertical roulette mechanism as recited in claim 1, further comprising a base section including a controller module and a computer module, the controller module including a plurality of connectors, the base section including an interactive display and one or more buttons configured to enable a player to interact with a roulette game at least partially displayed on the display, the wheel and the plurality of lights including connectors configured to mate with the plurality of connectors.

4. The vertical roulette mechanism as recited in claim 3, wherein the base section further includes one or more lights and one or more speakers, and wherein the roulette ball includes a light.

5. The vertical roulette mechanism as recited in claim 3, wherein the base section further includes a money/credit/card receiving/payout mechanism.

6. The vertical roulette mechanism as recited in claim 3, wherein the base section is configured to transmit randomly generated first control signals to the first drive mechanism to cause the wheel to rotate in the first direction as part of the roulette game, and wherein the base section is configured to transmit randomly generated second control signals to the second drive mechanism to cause the rim to rotate in the second direction as part of the roulette game.

7. The vertical roulette mechanism as recited in claim 6, further comprising:

a first braking mechanism for braking the wheel when it is rotating in the first direction, the base section being further configured to transmit randomly generated third control signals to the first braking mechanism to cause the wheel to stop rotating as part of the roulette game; and a second braking mechanism for braking the rim when it is rotating in the second direction, the base section being further configured to transmit randomly generated fourth control signals to the second braking mechanism to cause the rim to stop rotating as part of the roulette game.

8. The vertical roulette mechanism as recited in claim 1, further comprising:

a plurality of lights fixedly mounted to the support stand between the support stand and the wheel, the plurality of lights configured to illuminate the wheel so the numbers are visible to a player of the vertical roulette mechanism, wherein rotation of the wheel, rotation of the rim, and illumination of the plurality of lights simulates the roulette ball spinning around the wheel of a horizontal roulette wheel.

9. The vertical roulette mechanism as recited in claim 1, wherein the base section includes an upper section and a lower section and the display is positioned in the upper section.

10. The vertical roulette mechanism as recited in claim 1, further comprising a base section connected to the support stand, the base section including a seat for a single player.

11. The vertical roulette mechanism as recited in claim 1, wherein the first drive mechanism includes a first motor and a first belt and the second drive mechanism includes a second motor and a second belt.

12. A vertical roulette mechanism, comprising:

a support stand;

a wheel configured to be rotatably mounted to the support stand, the wheel including a plurality of numbers corresponding to a roulette wheel;

a first drive mechanism affixed to the support stand and configured to rotate the wheel in a first direction while the support stand remains stationary;

a rim configured to be rotatably mounted to the support stand, the rim including a roulette ball fixedly mounted to the rim; and a second drive mechanism affixed to the support stand and configured to rotate the rim in a second direction while the support stand remains stationary, the first direction being opposite to the second direction; and a base section including a controller module and a computer module, the controller module including a plurality of connectors, the base section including an interactive display configured to connect to the plurality of connectors and one or more buttons configured to enable a player to interact with a roulette game at least partially displayed on the display.

13. The vertical roulette mechanism as recited in claim 12, further comprising a plurality of lights fixedly mounted to the support stand between the support stand and the wheel, the plurality of lights configured to illuminate the wheel so the numbers are visible to a player, wherein the wheel and the plurality of lights including connectors configured to mate with the plurality of connectors.

14. The vertical roulette mechanism as recited in claim 12, wherein the base section further includes one or more lights and one or more speakers.

15. The vertical roulette mechanism as recited in claim 12, wherein the base section further includes a money/credit/card receiving/payout mechanism.

16. The vertical roulette mechanism as recited in claim 12, wherein the base section is configured to transmit randomly generated control signals to the first drive mechanism to cause the wheel to rotate as part of the roulette game and the second drive mechanism to cause the rim to rotate as part of the roulette game.

17. The vertical roulette mechanism as recited in claim 16, further comprising:

a first braking mechanism for braking the wheel when it is rotating in the first direction, the base section being further configured to transmit randomly generated control signals to the first braking mechanism to cause the wheel to stop rotating as part of the roulette game; and a second braking mechanism for braking the rim when it is rotating in the second direction, the base section being further configured to transmit randomly generated control signals to the second braking mechanism to cause the rim to stop rotating as part of the roulette game.

18. The vertical roulette mechanism as recited in claim 12, further comprising:

a plurality of lights fixedly mounted to the support stand between the support stand and the wheel, the plurality of lights configured to illuminate the wheel so the numbers are visible to a player of the vertical roulette mechanism, wherein rotation of the wheel, rotation of the rim, and illumination of the plurality of lights simulates the roulette ball spinning around the wheel of a horizontal roulette wheel.

19. The vertical roulette mechanism as recited in claim 12, wherein the base section includes an upper section and a lower section and a display is positioned in the upper section.

20. The vertical roulette mechanism as recited in claim 19, wherein the display is interactive and includes one or more buttons configured to enable a player to interact with a roulette game at least partially displayed on the display.

21. The vertical roulette mechanism as recited in claim 12, wherein the first drive mechanism includes a first motor and a first belt and the second drive mechanism includes a second motor and a second belt.

* * * * *